United States Patent
Gross et al.

(10) Patent No.: US 9,152,876 B1
(45) Date of Patent: Oct. 6, 2015

(54) METHODS AND SYSTEMS FOR EFFICIENT HANDWRITTEN CHARACTER SEGMENTATION

(71) Applicant: Xerox Corporation, Norwalk, CT (US)

(72) Inventors: Eric M. Gross, Rochester, NY (US); Eric S. Hamby, Webster, NY (US); Isaiah Simmons, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 35 days.

(21) Appl. No.: 14/218,184

(22) Filed: Mar. 18, 2014

(51) Int. Cl.
G06K 9/34 (2006.01)
G06K 9/03 (2006.01)
G06K 9/00 (2006.01)

(52) U.S. Cl.
CPC .............. *G06K 9/34* (2013.01); *G06K 9/00436* (2013.01); *G06K 9/036* (2013.01); *G06K 9/344* (2013.01); *G06K 9/348* (2013.01); *G06K 2209/01* (2013.01)

(58) Field of Classification Search
USPC ......... 382/179, 173, 189, 185, 159, 187, 190, 382/224, 313, 201, 298, 186, 115; 340/5.52, 5.82, 995.16; 345/156, 173, 345/175, 176, 179, 168; 235/472.01, 235/472.02; 358/473; 701/246; 710/7, 20
See application file for complete search history.

(56) References Cited

U.S. PATENT DOCUMENTS 5,835,632 A * 11/1998 Takasu et al. ................. 382/185
8,948,514 B2 * 2/2015 Ookawara .................... 382/189

* cited by examiner

*Primary Examiner* — Anh Do
(74) *Attorney, Agent, or Firm* — MH2 Technology Law Group LLP

(57) ABSTRACT

A system and method for determining handwritten character segmentation shape parameters for a user in automated handwriting recognition by prompting the user for a training sample; obtaining an image that includes handwritten text that corresponds to the training sample; sweeping the image with shapes corresponding to parameters to determine coordinates of the shapes in the image; segmenting the image into segmented characters based on the coordinates of the shapes; determining character segmentation accuracies of the parameters; and storing an association between the user and the parameters. The system and method can further include receiving a writing sample from the same user and utilizing the stored parameters to segment characters in the writing sample for use in automated handwriting recognition of the writing sample.

22 Claims, 4 Drawing Sheets

METHODS AND SYSTEMS FOR EFFICIENT HANDWRITTEN CHARACTER SEGMENTATION

TECHNICAL FIELD

The present disclosure relates generally to methods, systems, and computer-readable media for segmenting characters for handwritten character recognition.

BACKGROUND

Automated handwriting recognition or intelligent character recognition (hereinafter, "ICR") generally refers to an automated process for applying optical character recognition (hereinafter, "OCR") techniques to convert scanned or photographed images of handwritten text into computer-readable text. Conversion to computer-readable text allows for increased ability to edit, search, store, display, use in other processes, etc.

One difficulty with regard to ICR is in the area of character segmentation, which is often an important step in the ICR process. Character segmentation can refer to the process of isolating individual characters or a set of multiple characters from the rest of the image before character recognition. Unfortunately, handwritten characters are subject to certain factors, such as character intersection (e.g. in cursive handwriting), that can greatly degrade character segmentation and, thus, character recognition.

Accordingly, ICR technology may be improved by techniques for efficiently segmenting handwritten characters.

SUMMARY

The present disclosure relates generally to methods, systems, and computer readable media for providing these and other improvements to ICR technology.

Implementations of the present teachings relate to methods for determining handwritten character segmentation shape parameters for a user. In some embodiments, a computing device can display a set of characters; obtain an image that includes handwritten text of the user, where the handwritten text corresponds to the set of characters; determine a coordinate of a first shape within the image by sweeping the image with the first shape, where the first shape corresponds to a first parameter; segment the image into a segmented character based at least on the coordinate of the first shape; determine a character segmentation accuracy of the first parameter by comparing the segmented character with the set of characters, and store, based on the character segmentation accuracy of the first parameter, an association between the user and the first parameter.

In certain implementations, the computing device can further obtain a second image that includes handwritten text of the user; determine that the user is associated with the first parameter; determine a coordinate of the first shape within the second image by sweeping the second image with the first shape; segment the second image into multiple segmented characters based at least on the coordinate of the first shape; and recognize text within the multiple segmented characters.

In some embodiments, the first shape can be a line and the first parameter can be a slope of the line.

In further embodiments, the first parameter can be received from the user.

In other embodiments, the computing device can determine a coordinate of a second shape within the image by sweeping the image with the second shape that corresponds with a second parameter, where segmenting the image into the segmented character is further based on the coordinate of the second shape; and determining a character segmentation accuracy of the second parameter by comparing the segmented character with the set of characters.

In still further embodiments, the computing device can store, based on the character segmentation accuracy of the second parameter, an association between the user and the second parameter. Alternatively, the computing device can determine, based on the character segmentation accuracy of the second parameter, not to store an association between the user and the second parameter.

In some embodiments, the coordinate of the first shape within the image can be a plurality of coordinates of the first shape within the image.

In further embodiments, the segmented character can include multiple segmented characters and segmenting the image into the segmented character can include segmenting the image into the multiple segmented characters based at least on the coordinate of the first shape.

In still further embodiments, the computing device can, in response to determining not to store an association between the user and the second parameter, determine a coordinate of a third shape within the image by sweeping the image with the third shape corresponding to a third parameter, where segmenting the image into the segmented character is further based on the coordinate of the third shape; and determine a character segmentation accuracy of the third parameter by comparing the segmented character with the set of characters.

In other embodiments, the first parameter can be a set of multiple parameters.

Implementations of the present teachings relate to computer systems for determining handwritten character segmentation shape parameters for a user. In embodiments, the systems include one or more memory devices storing instructions, and one or more processors coupled to the one or more memory devices. The one or more processors are configured to execute the instructions to perform methods and operations. The methods and operations include displaying a set of characters; obtaining an image that includes handwritten text of the user, where the handwritten text corresponds to the set of characters; determining a coordinate of a first shape within the image by sweeping the image with the first shape, where the first shape corresponds to a first parameter; segmenting the image into a segmented character based at least on the coordinate of the first shape; determining a character segmentation accuracy of the first parameter by comparing the segmented character with the set of characters, and storing, based on the character segmentation accuracy of the first parameter, an association between the user and the first parameter.

In some embodiments, the one or more processors are configured to execute the instructions to perform methods and operations that further include obtaining a second image that includes handwritten text of the user; determining that the user is associated with the first parameter; determining a coordinate of the first shape within the second image by sweeping the second image with the first shape; segmenting the second image into multiple segmented characters based at least on the coordinate of the first shape; and recognizing text within the multiple segmented characters.

Implementations of the present teachings also relate to computer readable storage media storing instructions. The instructions cause one or more processors to perform methods and operations for determining handwritten character segmentation shape parameters for a user. The methods and operations include displaying a set of characters; obtaining an image that includes handwritten text of the user, where the handwritten text corresponds to the set of characters; determining a coordinate of a first shape within the image by sweeping the image with the first shape, where the first shape corresponds to a first parameter; segmenting the image into a segmented character based at least on the coordinate of the first shape; determining a character segmentation accuracy of the first parameter by comparing the segmented character with the set of characters, and storing, based on the character segmentation accuracy of the first parameter, an association between the user and the first parameter.

In some embodiments, the methods and operations performed by the one or more processors further include obtaining a second image that includes handwritten text of the user; determining that the user is associated with the first parameter; determining a coordinate of the first shape within the second image by sweeping the second image with the first shape; segmenting the second image into multiple segmented characters based at least on the coordinate of the first shape; and recognizing text within the multiple segmented characters.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
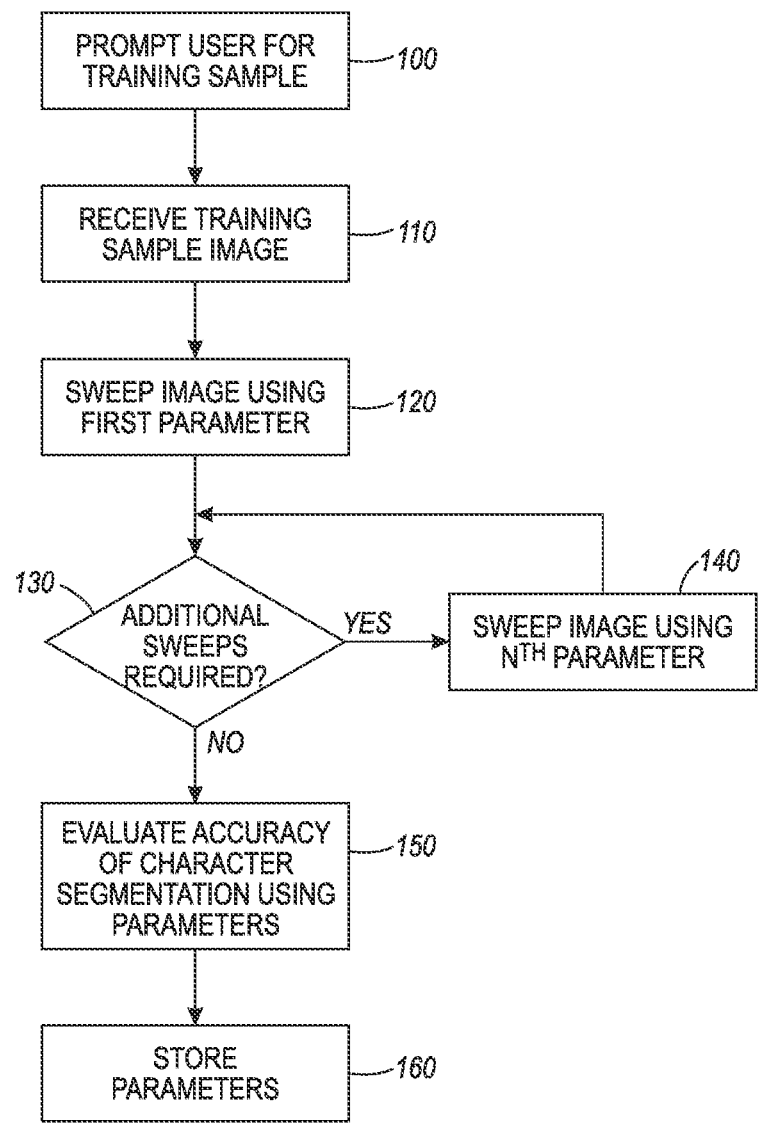
FIG. 1 is a flow diagram illustrating an exemplary method of determining user segmentation parameters based on a writing sample of a new user, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an exemplary method of determining user segmentation parameters based on a writing sample of a new user, consistent with certain disclosed embodiments. The process can begin in 100 when a computing device prompts a user for a training sample. In embodiments, the user can be a new user for which the computing device does not have access to character segmentation parameters and/or a user that has requested that the computing device analyze and extract character segmentation parameters from a training sample. For example a user may indicate that he/she is a new user, has not previously provided a training sample, wishes to create a new account, wishes to provide an initial training sample, etc.

The computing device can prompt the user by displaying a set of characters, words, and/or sentences (i.e. a "writing prompt") for the user to reproduce via handwriting. In some implementations, the writing prompt can be a predetermined writing prompt that is specifically constructed to contain certain character sequences. In some embodiments, the predetermined writing prompt can include character sequences that are common in a particular language. For example, the predetermined writing prompt can include a selection of 2-grams (2 characters in succession, also referred to as bi-grams) that account for a large percentage of all 2-grams that occur in the English language.

In other implementations, the computing device can select a writing prompt for the user using attributes and/or profile information of the user. In further implementations, the user can select a writing prompt for themselves.

In 110, the computing device can receive the training sample as an image that includes the user's handwritten reproduction of the writing prompt. For example, the user can scan, photograph, or otherwise convert a handwritten document into an electronic format accessible by the computing device.

In 120, the computing device can sweep the received image using a first parameter. Sweeping an image can refer to a process of matching a shape (e.g. a line, a spline, a second order curve, a third order curve, etc.) with various instances of the same shape within the image. Additionally, a shape can be associated with a parameter or a set of multiple parameters that helps define the shape, such as, for example, a slope, an angle, a height, a width, a curvature, or a combination thereof.

For example, the shape can be a line and the parameter a particular slope of the line. Accordingly, the process of sweeping the image can include scanning the user's handwritten reproduction of the writing prompt for one or more lines with the particular slope. A result of 120 can be, for example, the coordinates of each instance of a line with the particular slope occurring within the user's handwritten reproduction of the writing prompt.

In some implementations, the shape can be associated with a set of multiple parameters. For example, if the shape is a curve, the curve can be a function of two parameters such as a first derivative (slope) and a second derivative. As used herein, a parameter can refer to a single parameter or a set of multiple parameters.

In some embodiments, the parameter can be predetermined. For example, the shape can be a line and the parameter a slope, and the first parameter can be a slope of 85 degrees from the horizontal. The predetermined parameter can be selected based on, for example, known parameter values with high occurrences in handwritten text.

In other embodiments, the parameter can be selected by the user. For example, the user can input a slope manually. As an additional example, the computing device can display the user's handwritten reproduction of the writing prompt and the user can attempt to match a line to lines in the handwritten reproduction using an interface provided by the computing device.

In 130, the computing device can decide if additional sweeps if the image are required using different parameters. In some embodiments, the computing device can sweep the image using a predetermined number of parameters or various values within a predetermined range of parameters. For example, the computing device can sweep the image using three different parameters. In other embodiments, the number of parameters used can be set by the computing device based on, for example, whether the user input a parameter in 120, whether the first parameter or subsequent parameters yielded a threshold segmentation accuracy score, whether the first parameter or subsequent parameters yielded a threshold number of n-gram character segments, etc.

If the computing device determines that at least one additional sweep is required, the computing device can proceed to 140. In 140, the computing device can sweep the received image using the next parameter.

In some embodiments, the next parameter can be predetermined. For example, the shape can be a line and the parameter a slope, and the first parameter can be a slope of 85 degrees from the horizontal and a second parameter can be a slope of 80 degrees from the horizontal. The next predetermined parameter can be selected based on, for example, known parameter values with high occurrences in handwritten text.

In other embodiments, the next parameter can be selected by the user. For example, the user can input a slope manually. As an additional example, the computing device can display the user's handwritten reproduction of the writing prompt and the user can attempt to match a line to lines in the handwritten reproduction using an interface provided by the computing device.

The computing device can then proceed to 130 to determine if additional sweeps are required. If additional sweeps are required, the computing device can proceed to 140. If no additional sweeps are required, the computing device can proceed to 150.

In 150, the computing device can evaluate the accuracy of character segmentation performed using the first parameter and any subsequent parameters. In some embodiments, the computing device can segment characters at each coordinate detected in 120 and 140, and compare the segmented characters with the expected segmented characters of the writing prompt to determine an accuracy of the character segmentation.

For example, the computing device can determine that a character was correctly segmented when the character segmentation performed using the first parameter or subsequent parameter properly segments a single character or n-gram. The computing device can determine that a character was not correctly segmented when the character segmentation performed using the first parameter or subsequent parameter segmented a character or n-gram improperly (e.g. segmented a single character into two segments). The computing device can determine an accuracy score based on the number of correct character segmentations and the number of incorrect character segmentations.

In some implementations, the computing device can determine that an accuracy of the character segmentation does not meet a predetermined threshold. In such implementations, the computing device can then proceed to 140 to sweep the image using additional parameters until the threshold accuracy is achieved.

In some embodiments, an accuracy determination can be performed separately for the set of coordinates that resulted from the sweep for each parameter. For example, a first accuracy determination can be performed using the set of coordinates that resulted from the sweep with the first parameter, a second accuracy determination can be performed using the set of coordinates that resulted from the sweep with the second parameter, etc.

In some implementations, the computing device may require a predetermined number of parameters with a threshold accuracy score. For example, the computing device may require two parameters with a threshold accuracy score.

Accordingly, if the computing device determines that only one or less of the parameters resulted in a threshold accuracy score, the computing device can then proceed to 140 to sweep the image using additional parameters until the predetermined number of parameters with a threshold accuracy score is achieved.

In 160, the computing device can store one or more of the parameters. In embodiments, the computing device can store each parameter that achieved a threshold accuracy score. In other embodiments, the computing device can store all the parameters that were used to achieve a threshold accuracy.

The parameters can be associated with the user. For example, the parameters can be associated with a profile for the user and/or the association can be stored with the parameters. The parameters can then be utilized whenever the user submits additional handwriting samples. Accordingly, the computing device would not have to re-perform each of the above steps for the same user, but can reduce the search space for shapes of segmentation cut locations to the shapes created using the stored parameters.

While the steps depicted in FIG. 1 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 2:
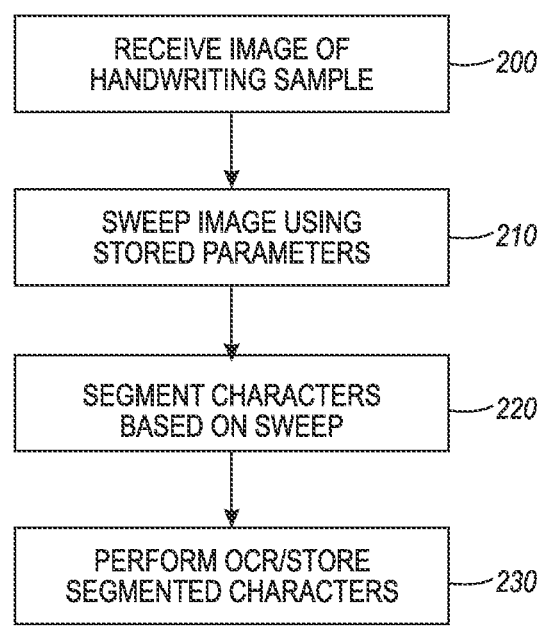
FIG. 2 is a flow diagram illustrating an exemplary method of segmenting characters from a writing sample of an existing user, consistent with certain disclosed embodiments.

FIG. 2 is a flow diagram illustrating an exemplary method of segmenting characters from a writing sample of an existing user, consistent with certain disclosed embodiments. The process can begin in 200, when the computing device receives an image that includes handwritten text from the user. For example, the user can scan, photograph, or otherwise convert a handwritten document into an electronic format accessible by the computing device.

In 210, the computing device can sweep the received image using the stored parameters (e.g. stored in 160 of FIG. 1). For example, the stored parameters can be line slopes, and the computing device can match lines in the received image with lines with the stored line slopes. A result of 210 can be, for example, the coordinates of each instance of a line with a particular stored line slope occurring within the handwritten text from the user.

In 220, the computing device can segment characters in the received image using the coordinates that resulted from the sweep(s) in 210. The computing device can then segment the characters at the coordinates.

In 230, the computing device can store the segmented characters and/or perform further processing. For example, the computing device can perform optical character recognition (hereinafter, "OCR") on the segmented characters, and return the results (i.e. the recognized text) to the user.

While the steps depicted in FIG. 2 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 3:
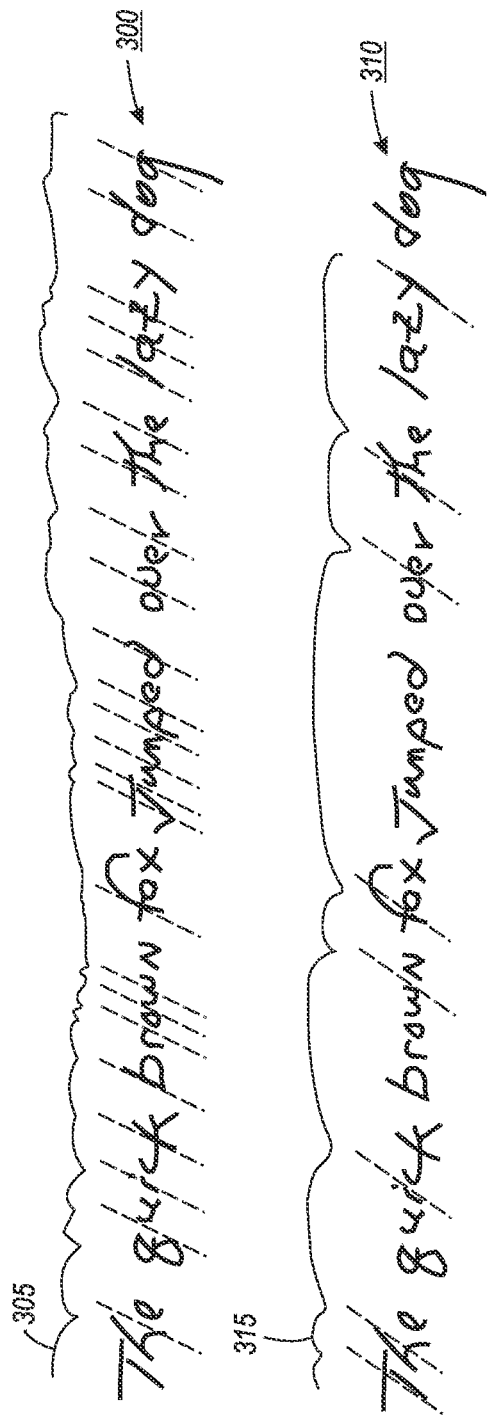
FIG. 3 is a diagram illustrating an exemplary writing sample from a user, consistent with certain disclosed embodiments.

FIG. 3 is a diagram illustrating an exemplary writing sample from a user, consistent with certain disclosed embodiments. FIG. 3 is intended merely for the purpose of illustration and is not intended to be limiting.

As depicted in FIG. 3, writing sample 300 and writing sample 310 represent a single writing handwriting sample received from a user. For example, the user can scan, photograph, or otherwise convert a handwritten document into an electronic format accessible by the computing device.

In some embodiments, writing sample 300 and writing sample 310 can represent a training sample received from the user where the user created the training sample in response to a writing prompt (e.g. the training sample received in 110 of FIG. 1). In other embodiments, writing sample 300 and writing sample 310 can represent the handwritten text received from the user in 200 of FIG. 2.

Dotted lines 305 represent visual representations of coordinates of instances where a line with a first particular slope (e.g. 80 degrees from the horizontal) occurs within the handwritten text from the user. Dotted lines 305 are merely for the purpose of illustration, and do not represent that the coordinates stretch past the characters or that a visual representation of the coordinates is presented. The coordinates of instances where the line with the first particular slope occurs within the handwritten text from the user can represent the coordinates determined during a sweep of a training sample created in response to a writing prompt where the slope is, for example, the first parameter attempted (e.g. 120 in FIG. 1) or can represent the coordinates determined during a sweep of handwritten text received from the user where the slope is, for example, the first stored parameter for the user (e.g. 210 in FIG. 2).

Dotted lines 315 represent visual representations of coordinates of instances where a line with a second particular slope (e.g. 75 degrees from the horizontal) occurs within the handwritten text from the user. Dotted lines 315 are merely for the purpose of illustration, and do not represent that the coordinates stretch past the characters or that a visual representation of the coordinates is presented. The coordinates of instances where the line with the second particular slope occurs within the handwritten text from the user can represent the coordinates determined during a sweep of a training sample created in response to a writing prompt where the slope is, for example, the second parameter attempted (e.g. 140 in FIG. 1) or can represent the coordinates determined during a sweep of handwritten text received from the user where the slope is, for example, the second stored parameter for the user (e.g. 210 in FIG. 2).

The computing device can cut character segments at each location of the coordinates represented by dotted lines 305 and/or dotted lines 315 to generate segmented characters. The segmented characters can then be used to calculate an accuracy score for the first particular slope and/or the second particular slope or can then be further processed to recognize the text in the writing sample.

Figure 4:
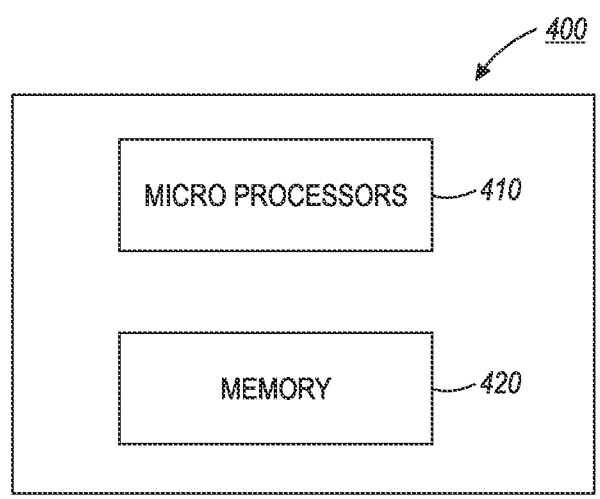
FIG. 4 is a diagram illustrating an exemplary hardware system for segmenting characters for handwritten character recognition, consistent with certain disclosed embodiments.

FIG. 4 is a diagram illustrating an exemplary hardware system for segmenting characters for handwritten character recognition, consistent with certain disclosed embodiments. Computing device 400 may represent any type of one or more computing devices.

Computing device 400 may include, for example, one or more microprocessors 410 of varying core configurations and clock frequencies; one or more memory devices or computer-readable media 420 of varying physical dimensions and storage capacities, such as flash drives, hard drives, random access memory, etc., for storing data, such as images, files, and program instructions for execution by one or more microprocessors 410; etc. One or more microprocessors 410, and one or more memory devices or computer-readable media 420 may be part of a single device as disclosed in FIG. 4 or may be contained within multiple devices. Those skilled in the art will appreciate that the above-described componentry is exemplary only, as computing device 400 may comprise any type of hardware componentry, including any necessary accompanying firmware or software, for performing the disclosed embodiments.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   displaying a set of characters;
   obtaining an image comprising handwritten text of a user, wherein the handwritten text corresponds to the set of characters;
   determining a coordinate of a first shape within the image by sweeping the image with the first shape, wherein the first shape corresponds to a first parameter;
   segmenting the image into a segmented character based at least on the coordinate of the first shape;
   determining a character segmentation accuracy of the first parameter by comparing the segmented character with the set of characters; and
   storing, based on the character segmentation accuracy of the first parameter, an association between the user and the first parameter.

2. The method of claim 1, further comprising:
   obtaining a second image comprising handwritten text of the user;
   determining that the user is associated with the first parameter;
   determining a coordinate of the first shape within the second image by sweeping the second image with the first shape;
   segmenting the second image into a plurality of segmented characters based at least on the coordinate of the first shape; and
   recognizing text within the plurality of segmented characters.

3. The method of claim 1, wherein the first shape is a line and the first parameter is a slope.

4. The method of claim 1, wherein the first parameter is received from the user.

5. The method of claim 1, further comprising:
   determining a coordinate of a second shape within the image by sweeping the image with the second shape, wherein:
      the second shape corresponds to a second parameter, and
      segmenting the image into the segmented character is further based on the coordinate of the second shape; and
   determining a character segmentation accuracy of the second parameter by comparing the segmented character with the set of characters.

6. The method of claim 5, further comprising storing, based on the character segmentation accuracy of the second parameter, an association between the user and the second parameter.

7. The method of claim 5, further comprising determining, based on the character segmentation accuracy of the second parameter, not to store an association between the user and the second parameter.

8. The method of claim 1, wherein the coordinate of a first shape within the image comprises a plurality of coordinates of the first shape within the image.

9. The method of claim 1, wherein:
the segmented character comprises a plurality of segmented characters; and
segmenting the image into the segmented character comprises segmenting the image into the plurality of segmented characters based at least on the coordinate of the first shape.

10. The method of claim 7, further comprising:
in response to determining not to store an association between the user and the second parameter, determining a coordinate of a third shape within the image by sweeping the image with the third shape, wherein:
the third shape corresponds to a third parameter, and
segmenting the image into the segmented character is further based on the coordinate of the third shape; and
determining a character segmentation accuracy of the third parameter by comparing the segmented character with the set of characters.

11. The method of claim 1, wherein the first parameter is a set of multiple parameters.

12. A system comprising:
a processing system comprising one or more processors; and
a memory system comprising one or more computer-readable media, wherein the one or more computer-readable media contain instructions that, when executed by the processing system, cause the processing system to perform operations comprising:
displaying a set of characters;
obtaining an image comprising handwritten text of a user, wherein the handwritten text corresponds to the set of characters;
determining a coordinate of a first shape within the image by sweeping the image with the first shape, wherein the first shape corresponds to a first parameter;
segmenting the image into a segmented character based at least on the coordinate of the first shape;
determining a character segmentation accuracy of the first parameter by comparing the segmented character with the set of characters; and
storing, based on the character segmentation accuracy of the first parameter, an association between the user and the first parameter.

13. The system of claim 12, the operations further comprising:
obtaining a second image comprising handwritten text of the user;
determining that the user is associated with the first parameter;
determining a coordinate of the first shape within the second image by sweeping the second image with the first shape;
segmenting the second image into a plurality of segmented characters based at least on the coordinate of the first shape; and
recognizing text within the plurality of segmented characters.

14. The system of claim 12, wherein the first shape is a line and the first parameter is a slope.

15. The system of claim 12, wherein the first parameter is received from the user.

16. The system of claim 12, the operations further comprising:
determining a coordinate of a second shape within the image by sweeping the image with the second shape, wherein:
the second shape corresponds to a second parameter, and
segmenting the image into the segmented character is further based on the coordinate of the second shape; and
determining a character segmentation accuracy of the second parameter by comparing the segmented character with the set of characters.

17. The system of claim 16, the operations further comprising storing, based on the character segmentation accuracy of the second parameter, an association between the user and the second parameter.

18. The system of claim 16, the operations further comprising determining, based on the character segmentation accuracy of the second parameter, not to store an association between the user and the second parameter.

19. The system of claim 12, wherein the coordinate of a first shape within the image comprises a plurality of coordinates of the first shape within the image.

20. The system of claim 12, wherein:
the segmented character comprises a plurality of segmented characters; and
segmenting the image into the segmented character comprises segmenting the image into the plurality of segmented characters based at least on the coordinate of the first shape.

21. The system of claim 18, the operations further comprising:
in response to determining not to store an association between the user and the second parameter, determining a coordinate of a third shape within the image by sweeping the image with the third shape, wherein:
the third shape corresponds to a third parameter, and
segmenting the image into the segmented character is further based on the coordinate of the third shape; and
determining a character segmentation accuracy of the third parameter by comparing the segmented character with the set of characters.

22. The system of claim 12, wherein the first parameter is a set of multiple parameters.

\* \* \* \* \*